United States Patent
Li

(10) Patent No.: US 11,706,331 B2
(45) Date of Patent: Jul. 18, 2023

(54) INFORMATION PROCESSING METHOD AND APPARATUS, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Senlin Li, Guangdong (CN)

(73) Assignees: GUANGDONG OPPO MOBILE, Dongguan (CN); TELECOMMUNICATIONS CORP., LTD., Dongguan (CN)

( * ) Notice: Subject to any disclaimer, the term of this patent is extended or adjusted under 35 U.S.C. 154(b) by 27 days.

(21) Appl. No.: 17/198,729

(22) Filed: Mar. 11, 2021

(65) Prior Publication Data

US 2021/0203767 A1   Jul. 1, 2021

Related U.S. Application Data

(63) Continuation of application No. PCT/CN2019/095100, filed on Jul. 8, 2019.

(30) Foreign Application Priority Data

Sep. 12, 2018   (CN) .......................... 201811063792.1

(51) Int. Cl.
*G06F 16/11*   (2019.01)
*H04W 8/18*   (2009.01)
(Continued)

(52) U.S. Cl.
CPC ...... *H04M 1/72406* (2021.01); *G06F 16/122* (2019.01); *H04W 8/183* (2013.01)

(58) Field of Classification Search
CPC .......... H04M 1/72406; H04M 2250/56; G06F 16/122; G06F 8/38; G06F 8/41; G06F 9/451; G06F 9/44505; H04W 8/183
See application file for complete search history.

(56) References Cited

U.S. PATENT DOCUMENTS

| | | | |
|---|---|---|---|
| 2017/0147323 A1* | 5/2017 | Hu | ............... G06F 8/658 |
| 2018/0032634 A1 | 2/2018 | Greenberg et al. | |
| 2019/0179606 A1* | 6/2019 | Thangarathnam | ...... G10L 15/22 |

FOREIGN PATENT DOCUMENTS

| | | |
|---|---|---|
| CN | 102831190 A | 12/2012 |
| CN | 103714172 A | 4/2014 |

(Continued)

OTHER PUBLICATIONS

Chinese First office action with English Translation of Chinese application No. 201811063792.1 dated Jan. 2, 2020 (15 pages).
(Continued)

*Primary Examiner* — Joseph E Dean, Jr.
(74) *Attorney, Agent, or Firm* — Young Basile Hanlon & MacFarlane, P.C.

(57) ABSTRACT

An information processing method, comprising: in response to that a third party application receives an information display instruction, generating a download instruction; transmitting the download instruction to a processing platform, for prompting the processing platform to download a configuration file according to the download instruction; controlling the processing platform to parse the configuration file to generate display parameters; obtaining target information by analyzing the display parameters, and displaying the target information in the third party application.

20 Claims, 6 Drawing Sheets

(51) Int. Cl.
*G06F 9/445* (2018.01)
*H04M 1/72406* (2021.01)

(56) References Cited

FOREIGN PATENT DOCUMENTS

| | | |
|---|---|---|
| CN | 105354013 A | 2/2016 |
| CN | 105446739 A | 3/2016 |
| CN | 105912375 A | 8/2016 |
| CN | 106126284 A | 11/2016 |
| CN | 106201458 A | 12/2016 |
| CN | 106454403 A | 2/2017 |
| CN | 106781100 A | 5/2017 |
| CN | 106846451 A | 6/2017 |
| CN | 107402747 A | 11/2017 |
| CN | 108023960 A | 5/2018 |
| CN | 108334608 A | 7/2018 |
| CN | 109408136 A | 3/2019 |
| WO | 107018450 A | 8/2017 |
| WO | 108038148 A | 5/2018 |
| WO | 108228305 A | 6/2018 |

OTHER PUBLICATIONS

Chinese second office action with English Translation of Chinese application No. 201811063792.1 dated Aug. 11, 2020 (16 pages).
International Search Report with English Translation of International application No. PCT/CN2019/095100 dated Oct. 8, 2019 (16 pages).
Chinese third office action with English Translation of Chinese application No. 201811063792.1 dated Jan. 15, 2021 (14 pages).
Chinese Notification to Grant Patent Right for Invention for CN Application 201811063792.1 dated May 8, 2021. (6 pages).
Extended European Search Report for EP Application 19858994.7 dated Oct. 8, 2021. (10 pages).

* cited by examiner

INFORMATION PROCESSING METHOD AND APPARATUS, STORAGE MEDIUM, AND ELECTRONIC DEVICE

CROSS-REFERENCE TO RELATED APPLICATION(S)

The present disclosure is a continuation-application of International (PCT) Patent Application No. PCT/CN2019/095100 filed Jul. 8, 2019, which claims foreign priority of Chinese Patent Application No. 201811063792.1 filed on Sep. 12, 2018, the contents of both of which are hereby incorporated by reference.

TECHNICAL FIELD

The present disclosure relates to the field of information technology, and in particular, to an information processing method, an apparatus, a storage medium and an electronic device.

BACKGROUND

With the continuous development of technology, functions of electronic devices such as mobile phones are becoming more and more powerful. Users can browse information through a variety of applications, such as text information, image information, audio and video information, card information and so on.

At present, when a mobile phone browses the card information through a current application, a rendering engine is needed in the current application to render and display card code. Due to a variety of applications, types of rendering engines used are not necessarily the same, resulting in poor compatibility between display contents. Besides, storage space is wasted due to storage of a plurality of rendering engines.

SUMMARY

The embodiment of the application provides an information processing method, an apparatus, a storage medium and an electronic device.

In the first aspect, an information processing method is provided by some embodiments of the present disclosure. The method includes: generating a download instruction, in response to detecting a third party application receives an information display instruction; transmitting the download instruction to a processing platform, for prompting the processing platform to download a configuration file according to the download instruction, wherein the processing platform is configured to render information of a third party application; controlling the processing platform to parse a configuration file and generate display parameters; and obtaining target information by analyzing the display parameters, and displaying the target information in the third party application.

In the second aspect, an information processing apparatus is provided by some embodiments of the present disclosure. The information processing apparatus includes a generating unit, configured to generate a download instruction, in response to detecting a third party application receives an information display instruction; a transmission unit, configured to transmit the download instruction to a processing platform, for prompting the processing platform to download a configuration file according to the download instruction, wherein the processing platform is configured to render information of any third party application; a control unit, configured to control the processing platform to parse the configuration file and generate display parameters; and a display unit, configured to analyze the display parameters to obtain target information, and display the target information in the third party application.

In the second aspect, an electronic device is provided by some embodiments of the present disclosure. The electronic device includes a non-transitory memory and a processor, wherein the processor is configured to call a computer program stored in the non-transitory memory, to perform: generating a download instruction, in response to detecting a third party application receives an information display instruction; transmitting the download instruction to a processing platform, for prompting the processing platform to download a configuration file according to the download instruction, wherein the processing platform is configured to render information of any third party application; controlling the processing platform to parse the configuration file and generate display parameters; and obtaining target information by analyzing the display parameters, and displaying the target information in the third party application.

In the third aspect, anon-transitory storage medium is provided by some embodiments of the present disclosure. The non-transitory storage medium stores a computer program, which is callable by a computer, to perform operations: generating a download instruction, in response to detecting a third party application receives an information display instruction; transmitting the download instruction to a processing platform, for prompting the processing platform to download a configuration file according to the download instruction, wherein the processing platform is configured to render information of a third party application; controlling the processing platform to parse a configuration file and generate display parameters; and obtaining target information by analyzing the display parameters, and displaying the target information in the third party application.

BRIEF DESCRIPTION OF DRAWINGS

The technical solution and beneficial effects of the present disclosure will be obvious through detailed description of the specific embodiments of the disclosure in combination with the attached drawings.

DETAILED DESCRIPTION

Figure 1:
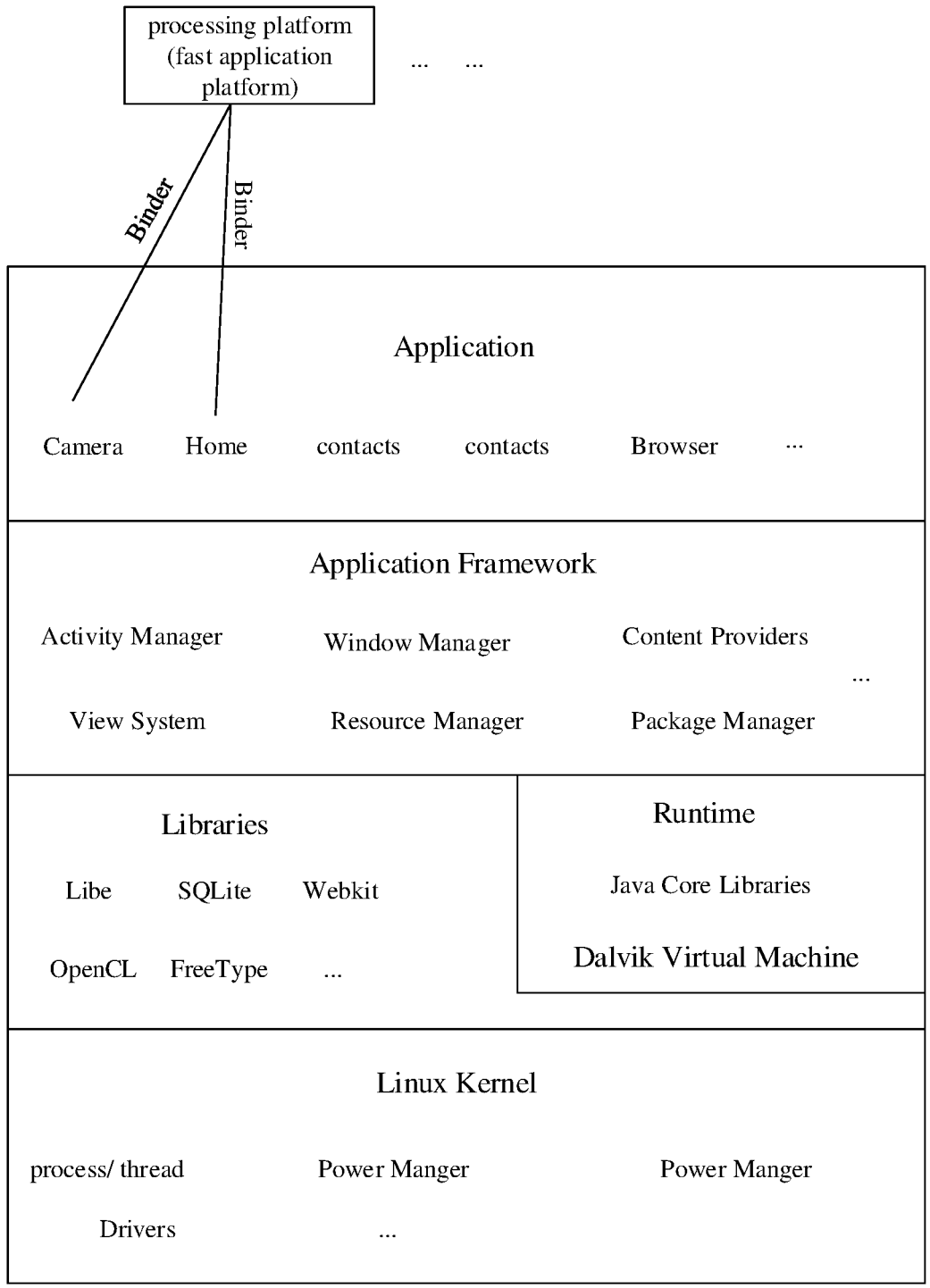
FIG. 1 is a system architecture diagram of operation of an electronic device according to some embodiments of the present disclosure.

As shown in the drawings, same reference numerals represent the same components, the principles of the present disclosure are illustrated by the implementation in a suitable computing environment. The following description is based on the specific embodiments of the present disclosure as illustrated, and not intended to limit the present disclosure.

The term "module" as used in the description can be regarded as a software object executed on the computing system. The different components, modules, engines and services described in the description can be regarded as implemented objects on the computing system. The device and method described herein can be implemented in the form of software or can be implemented on hardware, all of which are within the protection scope of the present disclosure.

As shown in FIG. 1, FIG. 1 is a system architecture diagram of operation of an electronic device according to some embodiments of the present disclosure. A system architecture is an Android system architecture. In one embodiment, the system architecture can also be an iPhone operating system (IOS) architecture, etc. The Android system architecture is an architecture of Android system. The Android system architecture, like its operating system, adopts a layered architecture. The layered architecture is divided into four layers. From high to low, the four layers are Android application layer, Android application framework layer, Android system running layer and Linux kernel layer.

Regarding an application layer, applications are programs written in Java language and run on a virtual machine, such as camera application, email client, SMS short message program and calendar.

Application framework layer is an application programming interface (API) framework used to write core applications released by Google. Developers can also use frameworks to develop their own applications, which simplifies structural design of program development. However, development principles of the frameworks must be abided.

Regarding system running layer (C/C++ library and Android runtime), when Android application framework is used, the Android system will support various components we use through some C/C++ libraries to better serve us, such as SQLite (relational database), WebKit (web browser engine).

Regarding Linux kernel layer, core system services of Android give Linux 2.6 kernel, such as security, memory management, process management, network protocol stack and driver model, all depend on the kernel. For example, binder IPC (Internet process connection) driver, or a special driver of Android, includes a separate device node and provides a function of inter process communication.

Display information transfer between different applications, such as card information transfer between the camera application and a home application, needs to transfer information across processes through binder communication. It should be noted that due to inconsistency of rendering engines used between different applications, the card information transmitted may not be opened in another application due to compatibility problems. Besides, there is a corresponding rendering engine in each application. Thus, storage space of software development kit (SDK) of the application will be increased and then storage space of the installation package of the application will be increased, which wastes storage space of an electronic device. Therefore, it is necessary to establish a processing platform (such as fast application platform) to render all applications uniformly.

It should be noted that the software development kit is generally a collection of development tools used by some software engineers to build application software s for specific software packages, software frameworks, hardware platforms, operating systems, etc.

The following is a detailed analysis.

In the embodiment, it will be described from the perspective of an information processing apparatus. The information processing apparatus can be integrated into electronic devices, such as mobile phone, tablet computer, PDA, etc.

An information processing method is provided by some embodiments. The information processing method may include the following operations.

In response to detecting a third party application receives an information display instruction, a download instruction is generated.

The download instruction is transmitted to a processing platform, for prompting the processing platform to download a configuration file according to the download instruction. The processing platform is configured to render information of any third party application.

The processing platform is controlled to parse the configuration file and generate display parameters.

The display parameters are analyzed to obtain target information, and the target information is displayed in the third party application.

In one embodiment, the controlling the processing platform to parse the configuration file and generate display parameters may include: loading a preset script file in the processing platform; controlling the preset script file to parse the configuration file and generate the display parameters corresponding to the configuration file.

In one embodiment, the controlling the preset script file to parse the configuration file and generate the display parameters corresponding to the configuration file may include: controlling the preset script file to parse global configuration information of the configuration file by the preset script file and generate information of a node object-tree corresponding to the global configuration information; and determining the information of the node object-tree as the display parameters.

In one embodiment, the obtaining target information by analyzing the display parameters, and displaying the target information in the third party application may include: obtaining the target information corresponding to nodes of the node object-tree by traversing the node object-tree; determining display position according to the target information in the third party application and displaying the target information in the display position.

In one embodiment, the transmitting the download instruction to a processing platform, for prompting the processing platform to download the configuration file according to the download instruction may include: transmitting the download instruction to the processing platform, wherein the download instruction carries an identifier of the target information; controlling the processing platform to send the download instruction to a configuration server, and receive the configuration file returned by the configuration server according to the identifier of the target information.

In one embodiment, the controlling the processing platform to parse the configuration file and generate display parameters may include: controlling a rendering engine in the processing platform to render and parse the configuration file, and generate display parameters including arrangement rules of each display element.

In one embodiment, the obtaining target information by analyzing the display parameter and displaying the target information in the third party application may include: controlling the processing platform to distribute the display parameters to the third party application; obtaining the target information by controlling view components in the third party application to analyze the display parameters, wherein the target information may include a display attribute of each display element and a display position of each display element in the display parameters, generating a view widget according to the display attribute, and displaying the view widget in a corresponding display position.

Figure 2:
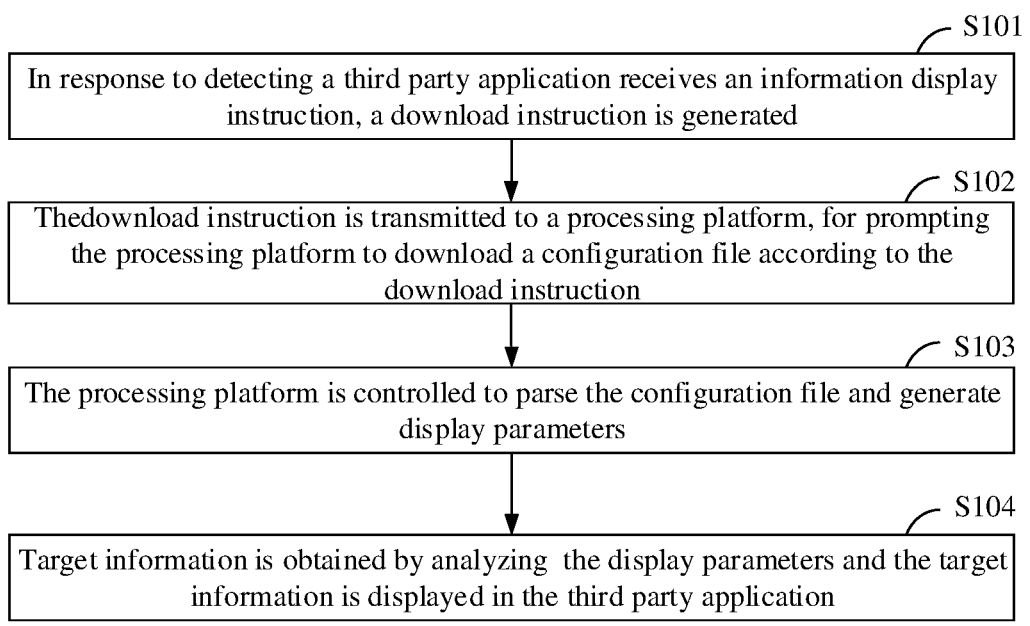
FIG. 2 is a flow chart of an information processing method according to some embodiments of the present disclosure.

An information processing method is provided by some embodiments of the present disclosure. As shown in FIG. 2, the information processing method may include the following operations.

At block S101, in response to detecting a third party application receives an information display instruction, a download instruction is generated.

The third party application can include a variety of applications, such as browser application, voice assistant application, or search application, etc. The information display instruction can be picture information display instruction, text information display instruction or card information display instruction.

Furthermore, in response to detecting the third party application receives the information display instruction, that is, in response to detecting real-time picture information, text information or card information needs to be displayed, the download instruction will be generated correspondingly. The download instruction includes a request instruction for downloading display information.

At block S102, the download instruction is transmitted to a processing platform, for prompting the processing platform to download a configuration file according to the download instruction.

The processing platform is configured to render information of the third party application. The processing platform can be a platform for downloading and distributing the display information. That is, generation of the display information of all the third party applications is downloaded and rendered by the processing platform, and rendered data is distributed to corresponding applications by the processing platform. Thus, the applications can directly display information.

Furthermore, an electronic device will transmit the download instruction to the processing platform, and the processing platform will download the configuration file according to the download instruction through a network. The configuration file can include three parts: a template, a function code and a display style of the display information.

In some embodiments, the transmitting the download instruction to the processing platform, for prompting the processing platform to download the configuration file according to the download instruction may include the following operations.

(1) The download instruction is transmitted to the processing platform.

(2) The processing platform is controlled to send the download instruction to a configuration server and receive the configuration file returned by the configuration server according to an identifier of the target information.

The electronic device transmits a generated download instruction to the processing platform. The download instruction carries the identifier of the target information.

That is, the download instruction carries the identifier of the target information of the target information to be downloaded and displayed in the download instruction.

It can be understood that the target information to be displayed in the third party application forms the configuration file in the form of code and is stored in the configuration server. Each configuration file is associated with the identifier of the target information of corresponding target information. Therefore, the processing platform is controlled to send the identifier of the target information carried by the download instruction to the configuration server, and the configuration server will return the configuration file associated with the identifier of the target information to the processing platform of the electronic device.

At block S103, the processing platform is controlled to parse the configuration file and generate display parameters.

After receiving the configuration file, the electronic device will control the rendering engine in the processing platform to render and parse the configuration file and generate the display parameters including the arrangement rules of each display element. The display elements can be pictures and text, and the arrangement rules are the display arrangement rules of pictures and text. Therefore, the configuration file of the target information of all third party applications need to be displayed are rendered by the rendering engine in the processing platform. Thus, the SDK in other third party applications does not need the rendering engine, which can reduce storage space of application installation files, save the storage space of electronic devices. Besides, the display information of each third party application can be shared with each other, which solves the problem of compatibility.

In some embodiments, the controlling the processing platform to parse the configuration file and generate the display parameters may include the following operations.

(1) A preset script file can be loaded in the processing platform.

(2) The preset script file is controlled to parse the configuration file and generate the display parameters corresponding to the configuration file.

The processing platform can be a fast application platform. The fast application platform can include the preset script file. The preset script file can be understood as a rendering engine. The preset script file can be a JavaScript script language framework. The JavaScript is a script language belonging to the network and has been widely used in web application development. The JavaScript is commonly used to add various dynamic functions to web pages and provide users with more fluent and beautiful browsing effect. The JavaScript script language framework can render and analyze downloaded data.

Furthermore, in response to receiving the configuration file, the preset script file in the processing platform can be loaded. The configuration file can be rendered and parsed by the preset script file. The configuration file can be parsed into display parameters including a plurality of display elements and layout relationship between display elements.

In some embodiments, the controlling the preset script file to parse the configuration file and generate the corresponding display parameters of the configuration file may include the following operations.

(1.1) The preset script file is controlling to parse global configuration information of the configuration file and generate information of a node object-tree corresponding to the global configuration information.

(1.2) The information of the node object-tree is determined as the display parameters.

The information of the node object-tree (document object model tree, DOM tree) can represent the layout rules between each display element in the target information. The node object-tree includes a plurality of nodes, and each node corresponds to a display element in the target information. The global configuration information includes a template, a function code and a display style of the display information. The template, the function code and the display style in the configuration file are parsed by JavaScript scripting language framework. A corresponding node object-tree is generated from the template, the function code and the display style, and the corresponding node object-tree is determined as the display parameters.

At block S104, Target information is obtained by analyzing the display parameters and the target information is displayed in the third party application.

The processing platform will distribute the display parameters after rendering and parsing the configuration file to the third party application. After the third party application receives the display parameters, view components will analyze the display parameters, determine display attribute and display position of each display element in the display parameters, generate a view widget according to the display attribute and set each view widget in a corresponding display position.

In some embodiments, the obtaining the target information by analyzing the display parameters and displaying the target information in the third party application may include the following operations.

(1) The target information corresponding to nodes of the object-tree is obtained by traversing the node object-tree.

(2) Display position according to the target information in the third party application is determined, and the target information is displayed in the display position.

The electronic device can traverse each node in the node object-tree to obtain a display element and a corresponding display position of the display element of each node. The display elements corresponding to all nodes and the display positions of the display elements constitute the target information.

Furthermore, the display position of the target information in the third party application is determined according to the display position, and the target information is displayed in the corresponding display position to realize the display of the target information.

It can be seen from the above, the information processing method provided by the embodiment. In response to detecting a third party application receives an information display instruction, a download instruction is generated. The download instruction is transmitted to a processing platform, for prompting the processing platform to download the configuration file according to the download instruction. The processing platform is controlled to parse the configuration file to generate display parameters. The display parameters are analyzed to obtain target information and the target information is displayed in the third party application. In this way, when the third party application needs to display information, the display data can be downloaded and analyzed through a standard rendering engine in the processing platform, which avoids poor compatibility between the display information and saves the storage space.

According to the method described in the above-mentioned embodiments, the following examples will be further described in detail.

Figure 3:
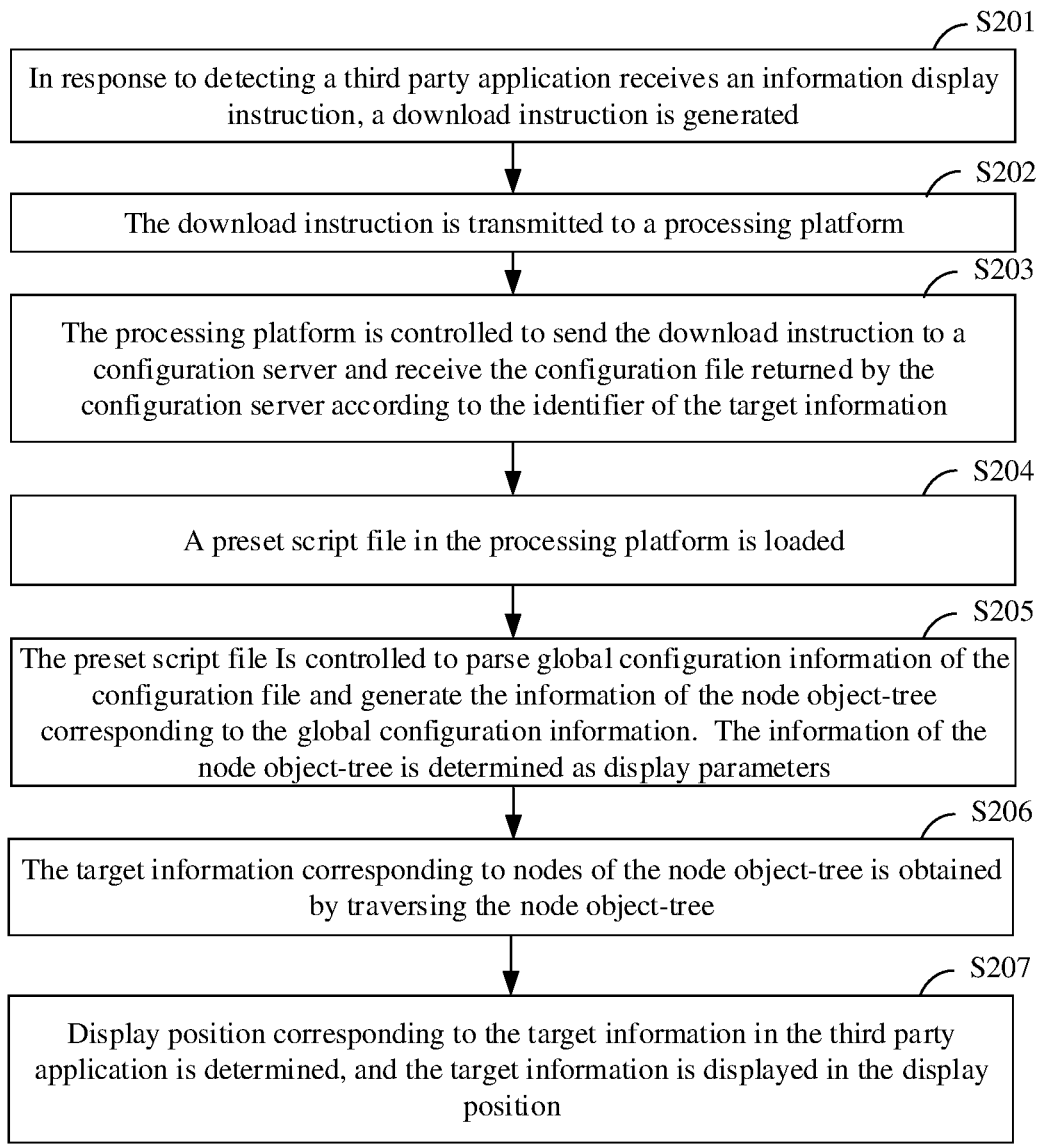
FIG. 3 is another flow chart of an information processing method according to some embodiments of the present disclosure.

As shown in FIG. 3, another flow chart of an information processing method provided by some embodiments of the present disclosure.

Specifically, the method may include the following operations.

At block S201, in response to detecting a third party application receives an information display instruction, a download instruction is generated.

It should be noted that in order to better illustrate the embodiment, a mobile phone as a terminal, card information as an information, and fast application platform as processing platform are taken as examples. The card information usually refers to a rectangle containing certain picture and text information as an entrance to more detailed information. Nowadays, while ensuring an excellent usability of an interface, card design has even become a default method to balance interface aesthetics, because a card is very convenient to show that content in the interface is composed of different elements.

The third party applications can include a variety of applications, such as browser applications, voice assistant applications or search applications. When a voice assistant application or a search application is detected to query weather information, the mobile phone will generate a weather information display instruction, and generate the download instruction according to the weather information display instruction.

At block S202, the download instruction is transmitted to a processing platform.

The fast application platform includes a JavaScript script language framework. The fast application platform can render and transmit the card information that needs to be displayed in a browser application, the voice assistant application or the search application. Therefore, the mobile phone transmits the download instruction to the processing platform, and the download instruction carries an identifier of the target information corresponding to weather card information.

At block S203, the processing platform is controlled to send the download instruction to a configuration server and receive the configuration file returned by the configuration server according to the identifier of the target information.

The mobile phone controls the fast application platform to send the identifier of the target information corresponding to the weather card information to the configuration server. After receiving the identifier of the target information, the configuration server will return the configuration file corresponding to the identifier of the target information to the mobile phone. The configuration file may include global configuration information of a template, a function code and a display style of the weather card information, which is the computer program code.

Figure 4:
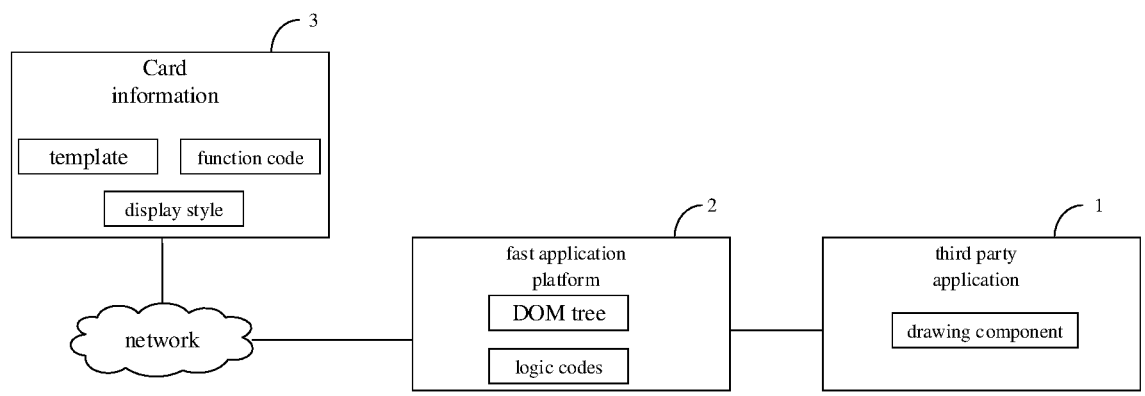
FIG. 4 is another system architecture diagram of operation of an electronic device according to some embodiments of present disclosure.

As shown in FIG. 4, the fast application platform 2 sends the identifier of the target information corresponding to the weather card information to the configuration server. After receiving the identifier of the target information, the configuration server will return the configuration file 3 corresponding to the identifier of the target information to the mobile phone through the network. The configuration file 3 include the global configuration information of a template, a function code and a display style of the weather card information.

At block S204, a preset script file in the processing platform is loaded.

After receiving the configuration file returned by the configuration server, the mobile phone will call and load the JavaScript script language framework in the processing platform.

At block S205, the present file is controlled to parse global configuration information of the configuration file and generate the information of the node object-tree corresponding to the global configuration information. The information of the node object-tree is determined as display parameters.

The mobile phone parses the template, the function code and the display style in the configuration file by a loaded JavaScript script language framework, to generate a node object-tree containing each display element in the weather card information. Each display element is a node, and the node object-tree is determined as the display parameters.

As shown in FIG. 4, the fast application platform 2 in the mobile phone parses the template, the function code and the display style in the configuration file 3 by the JavaScript script language framework, to generate a node object-tree and logic code. The logic code represents an implementation logic function of the weather card information.

At block S206, the target information corresponding to nodes of the node object-tree is obtained by traversing the node object-tree.

The mobile phone traverses each node (i.e. display element) in the node object-tree one by one to determine a display attribute of each display element and display position of each display element. The display attribute indicates whether the display element is a picture or text. That is, target information corresponding to the node is obtained.

At block S207, display position corresponding to the target information in the third party application is determined, and the target information is displayed in the display position.

The mobile phone determines the display position of the target information in the third party application according to the display position of the target information. The mobile phone draws the display elements included in the weather card information through the drawing component in the operating system of the mobile phone and sets each display element in a corresponding display position to realize display of the weather card information. Because the fast application platform realizes unified rendering of the configuration file, the SDK in the browser application, the voice assistant application or the search application can save the rendering engine and storage space. In addition, because generated weather card information is rendered by general rendering engine, different applications can quickly retrieve the weather card information for display, which solves the problem of incompatibility between card information.

As shown in FIG. 4, the third party application 1 in the mobile phone analyzes the DOM tree and logic code generated by the fast application platform through the drawing component to draw the weather card information according to the display position of the third party application.

It can be seen from the above, the information processing method provided by the embodiment. In response to detecting the third party application receives the information display instruction, the download instruction is generated. The download instruction is transmitted to the fast application platform. The fast application platform transmits the download instruction to a configuration server to receive a configuration file returned by the configuration server. The JavaScript script language framework in the fast application platform is loaded to parse the global configuration file in the configuration file and generate the information of the node object-tree corresponding to the global configuration information. The information of the node object-tree is determined as display parameters. The whole of nodes of the node object-tree is traversed according to the drawing component to obtain the target information corresponding to the nodes. The target information is displayed in the display positions of the third party application. In this way, when the third party application needs to display information, the display data can be downloaded and analyzed by the standard rendering engine in the processing platform, which avoids the poor compatibility between the display information and saves the storage space.

In order to better implement the information processing method provided by the embodiments of the present disclosure, an apparatus based on the above information processing method is provided by some embodiments of the present disclosure. Meaning of nouns is the same as that in the above information processing method. For specific implementation details, description in method embodiments can be referred.

The embodiment of the application provides an information processing apparatus. The information processing apparatus may include: a generating unit configured to generate a download instruction, in response to detecting a third party application receives an information display instruction; a transmission unit configured to transmit the download instruction to a processing platform, for prompting the processing platform to download a configuration file according to the download instruction, wherein the processing platform is configured to render information of a third party application; a control unit configured to control the processing platform to parse the configuration file and generate display parameters; and a display unit configured to obtain target information by analyzing the display parameters, and display the target information in the third party application.

In one embodiment, the control unit may include: a loading sub unit configured to load a preset script file in the processing platform; an parsing sub unit configured to parse the configuration file by the preset script file and generate the display parameters corresponding to the configuration file.

In one embodiment, the parsing sub unit is specifically configured to: parse global configuration information of the configuration file by the preset script file and generate information of a node object-tree corresponding to the global configuration information, and determine the information of the node object-tree as the display parameters.

In one embodiment, the display unit is specifically configured to: obtain the target information corresponding to nodes of the node object-tree by traversing the node object-tree; determine display position according to the target information in the third party application, and display the target information in the display position.

In one embodiment, the transmission unit is specifically configured to: transmit the download instruction to the processing platform, wherein the download instruction carries an identifier of the target information; control the processing platform to send the download instruction to a configuration server and receive the configuration file returned by the configuration server according to the identifier of the target information.

Figure 5:
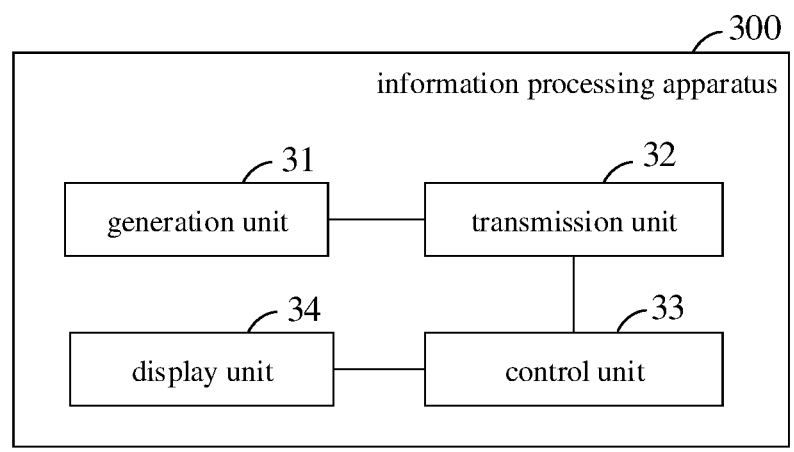
FIG. 5 is a module diagram of an information processing apparatus according to some embodiments of the present disclosure.

As shown in FIG. 5, FIG. 5 is a module diagram of an information processing apparatus according to some embodiments of the present disclosure. Specifically, the information processing apparatus 300 includes a generating unit 31, a transmission unit 32, a control unit 33, and a display unit 34.

The generating unit 31 is configured to generate a download instruction, in response to detecting a third party application receives an information display instruction.

The third party application can include a variety of applications, such as browser application, voice assistant application, or search application, etc. The information display instruction can be picture information display instruction, text information display instruction or card information display instruction.

Furthermore, when the generating unit 31 detects that the third party application has received the information display instruction, that is, when the generating unit 31 detects that real-time picture information, text information or card information needs to be displayed, the download instruction will be generated correspondingly. The download instruction comprises a request instruction for downloading display information.

The transmission unit 32 is configured to transmit the download instruction to a processing platform, for prompting the processing platform to download the configuration file according to the download instruction. The processing platform is configured to render information of a third party application.

The processing platform can be a platform for downloading and distributing the display information. That is, generation of the display information of all the third party applications is uniformly downloaded and rendered by the processing platform, and rendered data is distributed to corresponding applications by the processing platform, so that the applications can directly display information.

Furthermore, the transmission unit 32 will transmit the download instruction to the processing platform, and the processing platform will download the configuration file according to the download instruction through a network. The configuration file can include three parts: a template, a function code and a display style of the display information.

In some embodiments, the transmission unit 32 is specifically configured to transmit download instruction to the processing platform, and control the processing platform to send the download instruction to a configuration server and receive the configuration file returned by the configuration server according to the identifier of the target information.

The control unit 33 is configured to control the processing platform to parse the configuration file and generate display parameters.

After receiving the configuration file, the control unit 33 will control a rendering engine in the processing platform to render and parse the configuration file, and generate the display parameters including arrangement rules of each display element. The display elements can be pictures and text, and the arrangement rules are the display arrangement rules of pictures and text. Therefore, the configuration file of the target information of all third party applications need to be displayed are rendered by the rendering engine in the processing platform. Thus, the SDK in other third party applications does not need the rendering engine, which can reduce storage space of application installation files, save storage space of electronic devices. Besides, the display information of each third party application can be shared with each other, which solves the problem of compatibility.

The display unit 34 is configured to obtain target information by analyzing the display parameters, and display the target information in the third party application.

The processing platform will distribute the display parameters after rendering and parsing the configuration file to the third party application. After the display unit 34 receives the display parameters, view components will be controlled to obtain the target information by analyzing the display parameters, wherein the target information includes a display attribute of each display element and a display position of each display element, generate a view widget according to the display attribute and display each view widget in a corresponding display position.

In some embodiments, the display unit 34 is specifically configured to obtain target information corresponding to nodes of the node object-tree by to traversing the node object-tree, and determine display position according to the target information in the third party application, and display the target information in the display position.

Figure 6:
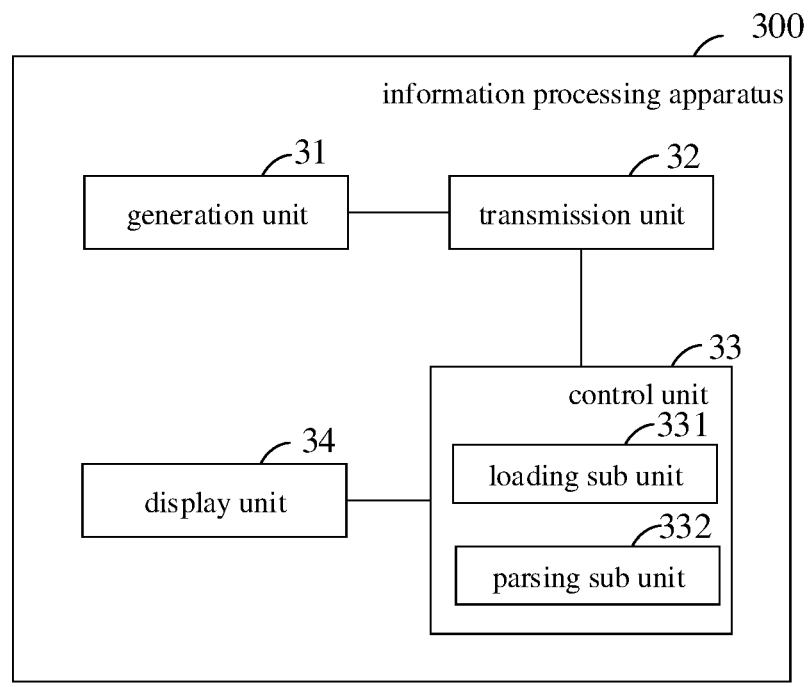
FIG. 6 is another module diagram of an information processing apparatus according to some embodiments of the present disclosure.

As shown in FIG. 6 together, FIG. 6 is another module diagram of an information processing apparatus according to some embodiments of the present disclosure. The information processing apparatus 300 can also include the follows.

The control unit 33 may include a loading sub unit 331 and a parsing sub unit 332.

Furthermore, the loading sub unit 331 is configured to load the preset script file in the processing platform. The parsing sub unit 332 is configured to parse the configuration file by the preset script file and generate the display parameters corresponding to the configuration file.

The parsing sub unit 332 is specifically configured to parse global configuration information of the configuration file by the preset script file, generate information of a node object-tree corresponding to the global configuration information, and determine the information of the node object-tree as the display parameters.

It can be seen from the above that an information processing apparatus provided by the embodiment generates the download instruction, in response to the generating unit 31 detects that the third party application receives the information display instruction. The transmission unit 32 transmits the download instruction to the processing platform, for prompting the processing platform to download the configuration file according to the download instruction. The control unit 33 controls the processing platform to parse the configuration file and generate display parameters. The display unit 34 obtains the target information by analyzing the display parameters and displays the target information in the third party application. In this way, when the third party application needs to display information, the display data can be downloaded and analyzed through the standard rendering engine in the processing platform, which avoids the poor compatibility between the display information and saves the storage space.

Figure 7:
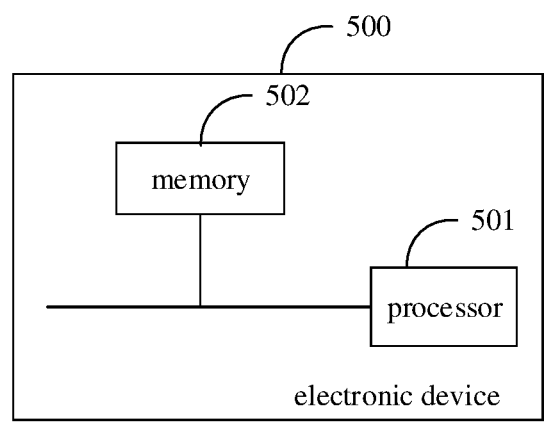
FIG. 7 is a structural schematic view of an electronic device according to some embodiments of the present disclosure.

An electronic device is provided by some embodiments of the present disclosure. As shown in FIG. 7, the electronic device 500 may include a processor 501 and a non-transitory memory 502. The processor 501 is electrically connected with the non-transitory memory 502.

The processor 501, as a control center of the electronic device 500, may be connected to various parts of the entire electronic device using various interfaces and lines. The processor 50 may execute various functions of the mobile terminal and processes data by running or executing the applications stored in the non-transitory memory 502, and call the data stored in the non-transitory memory 502, thereby monitoring the electronic device 500 as a whole.

The non-transitory memory 502 can be configured to store software programs and modules, and the processor 501 can execute various functional applications and data processing by running computer programs and modules stored in the non-transitory memory 502. The non-transitory memory 502 may mainly include a storage program area and a storage data area. The storage program area may store an operating system, a computer program (such as a sound playing function, an image playing function, etc.) required for at least one function, etc. The storage data area may store data created according to the use of an electronic device, etc. In addition, the non-transitory memory 502 may include a high-speed random access memory, and may also include a non-volatile memory, such as at least one disk storage device, a flash memory device, or other volatile solid-state storage device. Accordingly, the non-transitory memory 502 may also include a memory controller to provide access to the non-transitory memory 502 by the processor 501.

In the embodiment of the present disclosure, the processor 501 in the electronic device 500 may load the instructions corresponding to one or more computer program processes into the non-transitory memory 502 according to the following steps. The processor 501 may run the computer program stored in the non-transitory memory 502 to realize various functions, as follows.

In response to detecting a third party application receives an information display instruction, a download instruction is generated.

The download instruction is transmitted to a processing platform, for prompting the processing platform to download a configuration file according to the download instruction. The processing platform is configured to render information of a third party application.

The processing platform is controlled to parse a configuration file to generate display parameters.

The target information are obtained by analyzing the display parameter and the target information is displayed in the third party application.

In some embodiments, the processing platform includes a preset script file. In response to controlling the processing platform to parse the configuration file and generate display parameters, the processor 501 can specifically perform the following operations.

The preset script file can be loaded in the processing platform.

The preset script file is controlled to parse the configuration file and generate the display parameters corresponding to the configuration file.

In some embodiments, in response to controlling the preset script file to parse the configuration file and generate the display parameters corresponding to the configuration file, the processor 501 can specifically perform the following operations.

The preset script file is controlled to parse global configuration information of the configuration file and generate information of a node object-tree corresponding to the global configuration information.

The information of the node object-tree is determined as the display parameters.

In some embodiments, in response to obtaining the target information by analyzing the display parameters and displaying the target information in the third party application, the processor 501 may specifically perform the following operations.

The target information corresponding to the nodes of the node object-tree by traversing the node object-tree.

Display position according to the target information in the third party application is determined, and the target information is displayed according to the display position.

In some embodiments, in response to transmitting the download instruction to the processing platform, for prompting the processing platform to download the configuration file according to the download instruction, the processor 501 may specifically perform the following operations.

The download instruction is transmitted to the processing platform. The download instruction carries the identifier of the target information.

The processing platform is controlled to send the download instruction to a configuration server to receive the configuration file returned by the configuration server according to the identifier of the target information.

In some embodiments, in response to transmitting the download instruction to the processing platform, for prompting the processing platform to download the configuration file according to the download instruction, the processor 501 may specifically perform the following operations.

The download instruction is transmitted to the processing platform. The download instruction carries the identifier of the target information.

The processing platform is controlled to send the download instruction to a configuration server and receive the configuration file returned by the configuration server according to the identifier of the target information.

It can be seen from the above, the electronic device provided by the embodiment. In response to detecting a third party application receives an information display instruction, a download instruction is generated. The download instruction is transmitted to a processing platform, for prompting the processing platform to download the configuration file according to the download instruction. The processing platform is controlled to parse the configuration file and generate display parameters. The target information are obtained by analyzing the display parameter and the target information is displayed in the third party application. In this way, when the third party application needs to display information, the display data can be downloaded and analyzed through the standard rendering engine in the processing platform, which avoids the poor compatibility between the display information and saves the storage space.

Figure 8:
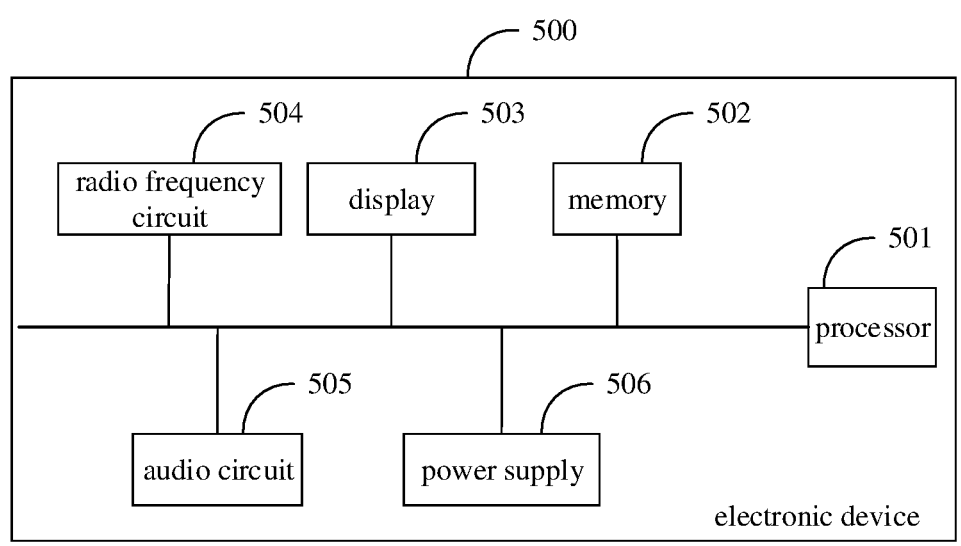
FIG. 8 is another structural schematic view of an electronic device according to some embodiments of the present disclosure.

As shown in FIG. 8 together, in some embodiments, the electronic device 500 may also include a display 503, a radio frequency circuit 504, an audio circuit 505, and a power supply 506. The display 503, the radio frequency circuit 504, the audio circuit 505 and the power supply 506 are respectively electrically connected with the processor 501.

The display 503 can be configured to display information input by users or provided to the user and various graphical user interfaces. The graphical user interfaces can be composed of graphics, text, icon, video and any combination thereof. The display 503 may include a display panel. In some embodiments, the display panel may be configured in the form of a liquid crystal display (LCD) or an organic light emitting diode (OLED).

The radio frequency circuit 504 can be configured to transmit and receive radio frequency signals to establish wireless communication with network devices or other electronic devices through wireless communication, and transmit and receive signals with network devices or other electronic devices.

The audio circuit 505 can be configured to provide an audio interface between a user and an electronic device through a loudspeaker and a microphone.

The power supply 506 can be configured to supply power to various components of the electronic device 500. In some embodiments, the power supply 506 can be logically connected with the processor 501 through the power management system, so as to realize functions of charging, discharging, and power consumption management through the power management system.

Although not shown in FIG. 8, the electronic device 500 may also include a camera, a Bluetooth module, and the like, which will not be repeated here.

The embodiment of the application also provides a storage medium. The storage medium stores computer programs. When the computer programs are running on the computer, the computer can execute the information processing method in any of the above embodiments, for example, in response to detecting a third party application receives an information display instruction, generating a download instruction; transmitting the download instruction to a processing platform, for prompting the processing platform to download a configuration file according to the download instruction, wherein the processing platform is configured to render information of a third party application; controlling the processing platform to parse a configuration file and generate display parameters; and obtaining target information by analyzing the display parameters, and displaying the target information in the third party application.

In the embodiment of the application, the storage medium can be a magnetic disk, optical disk, read only memory (ROM), or random access memory (RAM), etc.

In the above embodiments, the description of each embodiment has its own emphasis. For the part not detailed in one embodiment, please refer to the related description of other embodiments. It will not repeat here.

It should be noted that for the information processing method described in the embodiments of the present disclosure, These skilled in the art can understand that all or part of the process of realizing the information processing method described in the embodiments of the present disclosure can be completed by controlling the relevant hardware through a computer program, and the computer program can be stored in a computer readable storage medium, such as a non-transitory storage medium. The computer program may be executed by at least one processor, during executing the computer program, the process of the embodiment of the information processing method can be included. The storage medium can be magnetic disk, optical disk, read only memory, random access memory, etc.

For the information processing apparatus according to the embodiment of the present disclosure, each functional module can be integrated in a processing chip, or each module can be an independent physical existence, or two or more modules can be integrated in one module. The above integrated modules can be implemented in the form of hardware or software function modules. If the integrated module is realized in the form of software function module and sold or used as an independent product, it can also be stored in a computer readable storage medium, such as read-only memory, disk or optical disk, etc.

A method device for charging control, a storage device and an electronic device provided by the embodiment of the present disclosure are described in detail. In the description, specific examples are applied to explain the principle and embodiments of the disclosure. The description of the above embodiments is only used to help understand the method and core idea of the disclosure. Meanwhile, for those skilled in the art, according to the idea of the disclosure the specific implementations and application scope will be changed. In summary, the contents of the specification should not be interpreted as the limitation of the disclosure.

What is claimed is:

1. An information processing method, comprising:
generating a download instruction, in response to detecting a third party application receives an information display instruction;
transmitting the download instruction to a fast application platform, for prompting the fast application platform to download a configuration file according to the download instruction, wherein the fast application platform is configured to render information of any third party application;
controlling a rendering engine in the fast application platform to render and parse the configuration file and generate display parameters comprising arrangement rules of each display element; and
obtaining target information by analyzing the display parameters, and displaying the target information in the third party application.

2. The information processing method according to claim 1, wherein controlling the rendering engine in the fast application platform to render and parse the configuration file and generate the display parameters comprises:
loading a preset script file in the fast application platform; and
controlling the preset script file to parse the configuration file and generate the display parameters corresponding to the configuration file.

3. The information processing method according to claim 2, wherein controlling the preset script file to parse the configuration file and generate the display parameters corresponding to the configuration file comprises:
controlling the preset script file to parse global configuration information of the configuration file and generate information of a node object-tree corresponding to the global configuration information; and
determining the information of the node object-tree as the display parameters.

4. The information processing method according to claim 3, wherein containing the target information by analyzing the display parameters, and displaying the target information in the third party application comprises:
obtaining the target information corresponding to nodes of the node object-tree by traversing the node object-tree; and
determining display position according to the target information in the third party application, and displaying the target information in the display position.

5. The information processing method according to claim 4, wherein containing the target information by analyzing the display parameters, and displaying the target information in the third party application further comprises:
obtaining the target information corresponding to the nodes of the node object-tree by traversing the node object-tree, wherein the target information comprises a display element and the display position of the display element corresponding to each node of the node object-tree; and
displaying the display element in the display position in the application according to the display position.

6. The information processing method according to claim 2, wherein the preset script file is used as a rendering engine, to be dedicated to any information of any third party application, for prompting the any third party application without an individual rendering engine.

7. The information processing method according to claim 2, wherein the preset script file is a JavaScript script language framework.

8. The information processing method according to claim 1, wherein transmitting the download instruction to the fast application platform, for prompting the fast application platform to download the configuration file according to the download information comprises:
transmitting the download instruction to the fast application platform, wherein the download instruction carries an identifier of the target information; and
controlling the fast application platform to send the download instruction to a configuration server, and receive the configuration file returned by the configuration server according to the identifier of the target information.

9. The information processing method according to claim 1, wherein the configuration file comprises a template, a function code and a display style of display information.

10. The information processing method according to claim 1, wherein containing the target information by analyzing the display parameters and displaying the target information in the third party application comprises:
controlling the fast application platform to distribute the display parameters to the third party application;
obtaining the target information by controlling view components in the third party application to analyze the display parameters, wherein the target information comprises a display attribute of each display element and a display position of each display element;
generating a view widget according to the display attribute; and
displaying the view widget in a corresponding display position.

11. An electronic device comprises a non-transitory memory and a processor, wherein the processor is configured to call a computer program stored in the non-transitory memory, to perform:
generating a download instruction, in response to detecting a third party application receives an information display instruction;
transmitting the download instruction to a fast application platform, for prompting the fast application platform to download a configuration file according to the download instruction, wherein the fast application platform is configured to render information of any third party application;
controlling a rendering engine in the fast application platform to render and parse the configuration file and generate display parameters comprising arrangement rules of each display element; and
obtaining target information by analyzing the display parameters, and displaying the target information in the third party application.

12. The electronic device according to claim 11, wherein the processor is configured to call the computer programs stored in the non-transitory memory to perform:
loading a preset script file in the fast application platform; and
controlling the preset script file to parse the configuration file and generate the display parameters corresponding to the configuration file.

13. The electronic device according to claim 12, wherein the processor is configured to call the computer programs stored in the non-transitory memory to perform:
controlling the preset script file to parse global configuration information of the configuration file and generate information of a node object-tree corresponding to the global configuration information; and
determining the information of the node object-tree as the display parameters.

14. The electronic device according to claim 13, wherein the processor is configured to call the computer programs stored in the non-transitory memory to perform:
obtaining the target information corresponding to nodes of the node object-tree by traversing the node object-tree; and
determining display position according to the target information in the third party application, and displaying the target information in the display position.

15. The electronic device according to claim 14, wherein the processor is configured to call the computer programs stored in the non-transitory memory to perform:
obtaining the target information corresponding to the nodes of the node object-tree by traversing the node object-tree, wherein the target information comprises a display element and the display position of the display element corresponding to each node of the node object-tree; and
displaying the display element in the display position in the application according to the display position.

16. The electronic device according to claim 12, wherein the preset script file is used as a rendering engine, to be dedicated to any information of any third party application, for prompting the any third party application without an individual rendering engine.

17. The electronic device according to claim 11, wherein the processor is configured to call the computer programs stored in the non-transitory memory to perform:
transmitting the download instruction to the fast application platform, wherein the download instruction carries an identifier of the target information; and
controlling the fast application platform to send the download instruction to a configuration server, and receive the configuration file returned by the configuration server according to the identifier of the target information.

18. The electronic device according to claim 11, wherein the configuration file comprises a template, a function code, and a display style of display information.

19. The electronic device according to claim 11, wherein the processor is configured to call the computer programs stored in the non-transitory memory to perform:
controlling the fast application platform to distribute the display parameters to the third party application; and
obtaining the target information by controlling view components in the third party application to analyze the display parameters, wherein the target information comprises a display attribute of each display element and a display position of each display element; and
generating a view widget according to the display attribute, and displaying the view widget in a corresponding display position.

20. A non-transitory storage medium, wherein the non-transitory storage medium stores a computer program, which is callable by a computer, to perform:
generating a download instruction, in response to detecting a third party application receives an information display instruction;
transmitting the download instruction to a fast application platform, for prompting the fast application platform to download a file according to the download instruction, wherein the fast application platform is configured to render information of any third party application;
controlling a rendering engine in the fast application platform to render and parse a configuration file and generate display parameters comprising arrangement rules of each display element; and
obtaining target information by analyzing the display parameters, and displaying the target information in the third party application.

* * * * *